United States Patent [19]
Olegnowicz

[11] Patent Number: 6,032,833
[45] Date of Patent: Mar. 7, 2000

[54] NON-THROTTLING VALVE ASSEMBLY

[76] Inventor: Israel Olegnowicz, 360 Jefferson Dr., Charlottesville, Va. 22911

[21] Appl. No.: 09/122,573

[22] Filed: Jul. 24, 1998

[51] Int. Cl.[7] .............................. G01F 11/36; B67D 5/40
[52] U.S. Cl. ................................ 222/321.9; 222/321.2; 222/341; 222/385
[58] Field of Search ............................ 222/321.1, 321.2, 222/321.7, 321.9, 341, 385

[56] References Cited

U.S. PATENT DOCUMENTS

| | | | |
|---|---|---|---|
| 3,331,559 | 7/1967 | Fedit | 239/333 |
| 4,051,983 | 10/1977 | Anderson . | |
| 4,230,242 | 10/1980 | Meshberg | 222/321.2 |
| 4,274,560 | 6/1981 | Cater | 222/321.2 |
| 4,389,003 | 6/1983 | Meshberg | 222/321.2 |
| 4,606,479 | 8/1986 | Van Brocklin . | |
| 4,735,347 | 4/1988 | Schultz et al. | 222/321.2 |
| 4,923,094 | 5/1990 | O'Neill . | |
| 5,064,105 | 11/1991 | Montaner . | |
| 5,626,264 | 5/1997 | Florez . | |
| 5,702,031 | 12/1997 | Meshberg et al. | 222/321.2 X |

*Primary Examiner*—Kevin Shaver
*Assistant Examiner*—Keats Quinalty
*Attorney, Agent, or Firm*—Sheldon H. Parker

[57] ABSTRACT

The venting, precompression pump sprayer, includes a pump cylinder and a pump piston mounted for reciprocation within the cylinder. The piston applies a compression force to the fluid within a variable volume pump chamber. The piston has a hollow stem which serves as a discharge passage. A discharge valve seat is provided at the outlet end of the hollow stem of the piston. A discharge valve member is mounted for reciprocation within the hollow stem of the piston. The discharge valve member has a surface which is in sealing engagement with the valve seat when the pump sprayer is in the discharge closed position. Pressure is applied by the user to the spray cap member in order to reciprocate the piston and the valve member against the bias of a return spring. The discharge valve member has an elongated rod like region which extends downwardly to a valve inlet. An annular ring seal is mounted for liquid tight, sliding engagement on the discharge valve member's elongated rod like region. The ring seal engages a shoulder region of the pump housing, and provides an inlet seal when the ring seal is seated on the shoulder.

20 Claims, 5 Drawing Sheets

NON-THROTTLING VALVE ASSEMBLY

FIELD OF THE INVENTION

The invention relates to liquid spray pumps, and more particularly, to a priming arrangement for a venting pump and to an improved non-throttling valve assembly for use in applications, such as hair spray dispensers.

BACKGROUND OF THE INVENTION

There are a number of essential aspects of non-throttling spray pump mechanisms which have been addressed by prior patents. The first relates to a mechanism for priming the pump during the first use phase of the use of the pump, and the next relates to the pumping mechanism, for the reliable pumping of liquid from the container.

As well known in the art, the manually actuated precompression pump sprayer, otherwise referred to as a pressure build-up pump sprayer, has a reciprocable discharge valve member which opens the discharge at a threshold pump pressure reached during pumping as pump chamber pressure exceeds the force of a return spring. The threshold pressure is not reached to open the discharge while the pump chamber contains air, which is compressible. Thus, for the precompression pump sprayer to function satisfactorily, the pump chamber must first be primed, i.e., the unwanted air in the chamber must be evacuated and replaced by liquid product to be dispensed.

One approach taken in priming the pump chamber of a precompression sprayer is disclosed in U.S. Pat. No. 4,051,983 wherein a longitudinally extending rib or groove is formed on the inner wall of the bore of the pump housing in which the reciprocable discharge valve operates. A nose of the discharge valve, in the form of a popper valve, is normally seated against a discharge valve seat formed in the discharge passage of a hollow piston stem, under the action of an opposing spring force provided by the piston return spring. At the threshold pressure, the popper valve is forced away from its valve seat to open the discharge, in the known manner.

The popper valve has a seal in sliding sealing engagement with the bore in which the valve reciprocates. As the air in the unprimed pump chamber is compressible, the piston and poppet valve are lowered together upon depressing the plunger. At or near the end of the plunger down stroke, the seal between the poppet seal and the wall of the bore in which the poppet operates is interrupted when the poppet seal is juxtaposed to the rib or groove. The air in the pump chamber, which has now been compressed during the piston down stroke, is evacuated from the pump chamber directly into the container via the dip tube extending into the liquid product in the container. The compressed air flows down the tube by capillary action until product partially fills the pump chamber on each ensuing upstroke which draws liquid product into the pump chamber. As liquid product partially fills the pump chamber, it prevents the remaining volume of air in the pump chamber from being evacuated past the popper seal and into the container. This remaining volume of air must now be purged from the chamber to avoid issuance through the discharge orifice causing an undesirable sputtering and uneven spray.

Another approach taken in priming the pump chamber of a precompression pump sprayer is exemplified by U.S. Pat. No. 5,064,105, wherein one or more small protuberances are formed on the wall of the pump chamber. The protuberances deform the piston seal at or near of the end of the piston down stroke, thereby permitting unwanted air from the pump chamber to be evacuated into the container via a side port formed in the pump housing.

A still further arrangement provided for priming the pump chamber is disclosed in U.S. Pat. No. 4,923,094 in which the popper valve has a radially outwardly extending base which, at the end of the plunger down stroke, engages a projection on an inner wall of the closure. The projection forms a priming step for causing a poppet valve seal to shift away from its confronting wall to open a path for evacuating air from the pump chamber into the container via a container vent.

A further system is disclosed in U.S. Pat. No. 5,626,264. According to the patent, the air is purged from the pump chamber through the discharge orifice via the poppet seat seal. A fixed priming ramp, molded in the pump housing, extends toward an end of the discharge valve member in the path of reciprocation so that, at or near the end of the piston down stroke, the lower end of the valve member is deflected to one side by the ramp. The valve member, in the form of a poppet valve normally coaxial with the piston and cylinder, has a conical nose portion in sealing engagement with a discharge valve seat formed in the piston. When deflected the poppet cocks to one side so as to disrupt the discharge valve seal to allow air to escape from the pump chamber to atmosphere via the discharge orifice. On the ensuing upstroke, as the operator releases downward pressure on the plunger head, the piston of the U.S. Pat. No. 5,626,264 patent returns to its FIG. 1 position under the force of the return spring. The poppet is filly reseated, the pump chamber volume expands and suctions product up through the dip tube into the pump chamber. The liquid, under atmospheric pressure in the container that exceeds the sub-atmosphere pressure in the expanding pump chamber, fills the chamber as it by-passes chevron seal 33 at or beyond the end of the valve member upstroke. The liquid may be in-letted to the pump chamber as seal 33 raises slightly out of and/or is forced away from the inner wall of lower cylindrical section 13.

One or two full strokes is described in U.S. Pat. No. 5,626,264, as being sufficient to fully prime the pump. Thus, the approach to pump priming according to the invention may be the sole priming provided for the pump sprayer. It is noted that the sub-atmospheric pressure necessitates the use of a sufficiently strong return spring to counter the progressively increasing vacuum in the container.

SUMMARY OF THE INVENTION

The venting, pre-compression pump sprayer, includes a pump cylinder and a pump piston mounted for reciprocation within the cylinder. The piston applies a compression force to the fluid within a variable volume pump chamber. The piston has a hollow stem which serves as a discharge passage. A discharge valve seat is provided at the outlet end of the hollow stem of the piston. A discharge valve member is mounted for reciprocation within the hollow stem of the piston. The discharge valve member has a valve surface in sealing engagement with the valve seat when the pump sprayer is in the discharge closed position. The discharge valve member's valve surface is preferably a conical nose portion engageable with the discharge valve seat.

Pressure is applied by the user to the spray cap member in order to reciprocate the piston and the valve member substantially in unison against the bias of a return spring. The discharge valve member has an elongated rod like region which extends downwardly to a valve inlet.

An annular ring seal is mounted on the discharge valve member's elongated rod like region, for liquid tight, sliding engagement with the elongated region. The ring seal has a radially enlarged region positioned to engage a shoulder region of the pump housing, and thereby provide an inlet seal when said region is seated on the shoulder.

The shoulder is a reduced diameter shoulder on the housing and cooperates with the annular ring to control liquid flow through an inlet passage to the pump chamber. The elongated region has an element which cooperates with the inlet valve seal at the end portion of the down stroke movement of the piston, in order to expel entrapped air from said chamber outwardly of the pump chamber through the inlet passage, into the liquid container. This operation serves to prime the pump during the initial use of the pump. The cooperating element is at least one longitudinal seal breaking member on the elongated region, and can be one or more raised elements or grooves.

The ring seal member is an elongated member having a cylindrical body section and a neck section at its upper end. The neck section is in sliding and frictional engagement with elongated region whereas the cylindrical body section has a clearance fit with the elongated region.

The neck section of the ring seal member and the radially enlarged region positioned to engage said shoulder region of said pump housing are longitudinally offset from each other, with the neck section being positioned closer to the discharge end of said pump than the radially enlarged region.

The pump of the instant invention vents the air which is contained within the pumping chamber, into the container rather than to the atmosphere. This reduces the possibility of leakage during the priming step. The air contained in the pumping chamber is compressible, as compared to liquids, and thus must be vented. The compression of the air by the piston merely causes the air to compress, and upon release of the pressure, the air refills the space without producing a vacuum, which would draw replacement liquid into the pumping chamber. The outlet valving mechanism, which is suitable for use with non-compressible liquids, is not applicable to evacuating air from the pumping chamber.

The air is enabled to flow into the container, via the dip tube, by opening the seal between the piston chamber and the container, at the end of the compression stroke. The seal is provided by an inlet valve which slides on a valve rod and which seats on an interior shoulder of the pump housing.

The inlet valve does not frictionally engage with either the cylinder nor the inlet, as in U.S. Pat. No. 4,606,479, thus providing simpler functionality in practice, as well as easier component manufacture. Manufacturing tolerances are thus minimized, thereby reducing manufacturing costs. This also makes the valve design and function, independent from the density and viscosity of the liquid being pumped.

The priming of the pump is achieved by forcing air into the container, instead of venting to the exterior of the cylinder, as in U.S. Pat. No. 4,606,479 thus providing a system of improved liquid tightness.

The pump is a non-throttling pump that is easier and less expensive to manufacture than prior art pumps. The pump design provides wider production tolerances than are available with similar pumps using prior art designs. The pump shares the benefits of a moveable gravity independent, inlet valve, while providing the finer mist spray of a pressure activated pump, suitable for a variety of different liquid substances.

BRIEF DESCRIPTION OF THE DRAWINGS

The advantages of the instant disclosure will become more apparent when read with the specification and the drawings, wherein.

DETAILED DESCRIPTION OF THE PREFERRED EMBODIMENTS OF THE INVENTION

Figure 1:
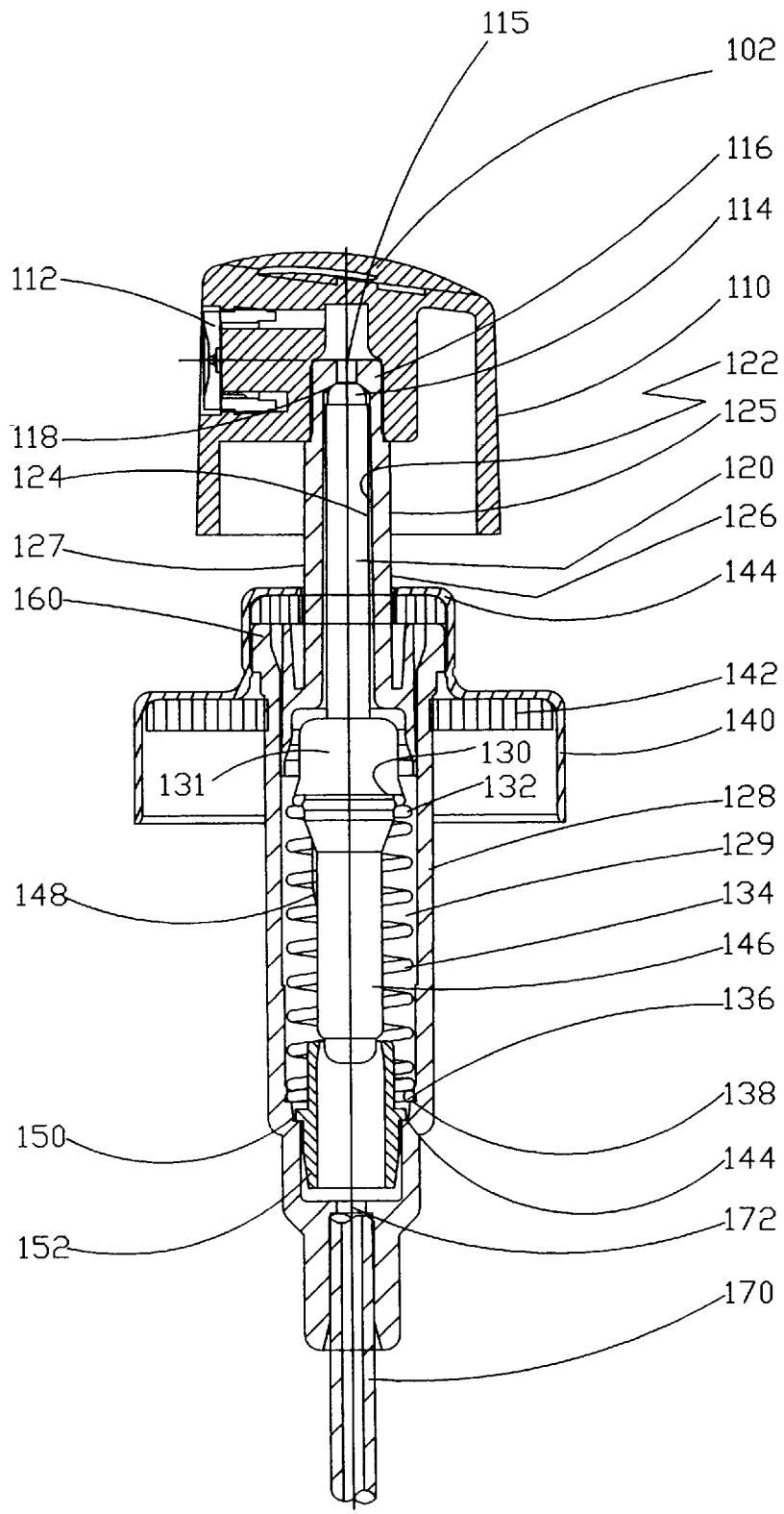
FIG. 1 is a cross-sectional view of the pump assembly in the rest position.

The disclosed pump provides a non-throttling valve assembly that is less costly to manufacture and reduces the potential to leak due to the priming design. The non-throttling pump includes an actuator cap member 110, which has a depression 102 in its upper surface for comfortable accommodation of the user's finger. The cap member 110 is fixed to the piston member 126. The piston 126 includes an elongated hollow upper stem 125 with a upper outlet end 116, having a reduced diameter opening 115. The nozzle 112, located within the cap 110 for atomizing the spray, is directly connected to the opening 115. The inner shoulder 118 of the upper end of the piston 126, mates with the hemispherical upper end 114 of the rod valve 120 to seal the liquid flow passage between the interior of the cap 110 and the liquid pumping chamber 129.

The pumping chamber 129 is formed within the cylinder 128, between the lower shaft 146 and the wall of the cylinder 128. The reciprocating valve member includes the upper rod 120, the radially enlarged element 131, the flared spring retainer member 130, and the lower shaft 146. The surface of the upper end 114 does not need to correspond directly to the shape of the inner shoulder 118, thus minimizing tolerance requirements. The curved, or hemispherical surface of the hemispherical upper end 114 is assured of mating with the interior surface of the inner shoulder 118, irrespective of the slope of the conical walls of the shoulder 118. Dimensions may vary the point at which contact is made, but does not alter the reliability of the seal that is produced by the valve.

A container mounting cap 140 is provided with an upper gasket 194, as well known in the art. The outer surface 127 of the piston 126 frictionally engages the inner opening of the liquid tight upper gasket 194. A second liquid sealing gasket 142 is provided between the mounting cap 140 and the outer surface of the cylinder 128.

The inner surface of the piston 122 is spaced from the outer surface 124 of the upper portion of the rod valve 120. The space provides a fluid flow channel between the upper end of the hollow piston 126 and the pumping chamber 129. In order to assure that there is a predetermined clearance between the inner surface 122 and the outer surface 124, the surface of either the rod valve 120, or the inner surface 122 of the piston 126, can be provided with longitudinally extending grooves or fins.

The spring 134, placed over the rod valve 146, has a reduced diameter upper coil region 132 to engage the shoulder of the flared region 130, thus biasing the reciprocating valve in the uppermost position. The lowermost coil 136 of the spring 134 engages the shoulder 138 of the interior wall of the cylinder 128. Since the liquid container is not under a vacuum, or sub-atmospheric pressure, the spring 134 does not need to counter an opposing force. The spring 134 only needs to maintain a seal until the liquid in the piston chamber 129 reaches a predetermined level during the pressurization cycle. At that point, the hemispherical upper end 114 is move away from the inner shoulder 118 and liquid is discharged in the form of a spray. It is noted that the replacement air which is drawn into the container to avoid a partial vacuum, through a small air intake on the shoulder of the cylinder as well known in the art. The upper edge 160, of the cylinder 128, can be provided with a notch through which air can be drawn into the cylinder. There is no significant tendency for fluid to leak out through the air intake path, since the pressure within the liquid container is either at, or below atmospheric pressure. Thus, air will flow into the chamber to achieve a pressure equalization, whereas liquid flow out of the container would produce a negative pressure differential. Additionally, the passage is small enough to accommodate air flow but not large enough to accommodate the passage of a liquid.

A ring valve 152 is positioned to freely move within the cylinder 128. The upper movement of the ring valve 152 is limited by the spring end 136 and the lower movement is limited by the shoulder 144. The shoulder 144 has a radial diameter that is less than the radially extending flange 150 of the ring valve 152. Engagement of the flange 150 with the shoulder 144 of the cylinder 128 provides a fluid tight seal within the cylinder 128. Additionally, the flange 150 engages the spring 134, thereby limiting the upward movement of the ring valve 152 during the upward stroke.

A hollow dip tube 170 provides fluid communication between the interior of the liquid container, (not shown), and the interior of the cylinder 128. The lower end of the cylinder 128 is in rigid engagement with the dip tube 170, in the region of the inlet 172. Preferably, the diameter of the dip tube 170 is slightly greater than the inner surface diameter of the inlet end of the cylinder 128, providing a force fit between the two parts, as well known in the art.

Figure 3:
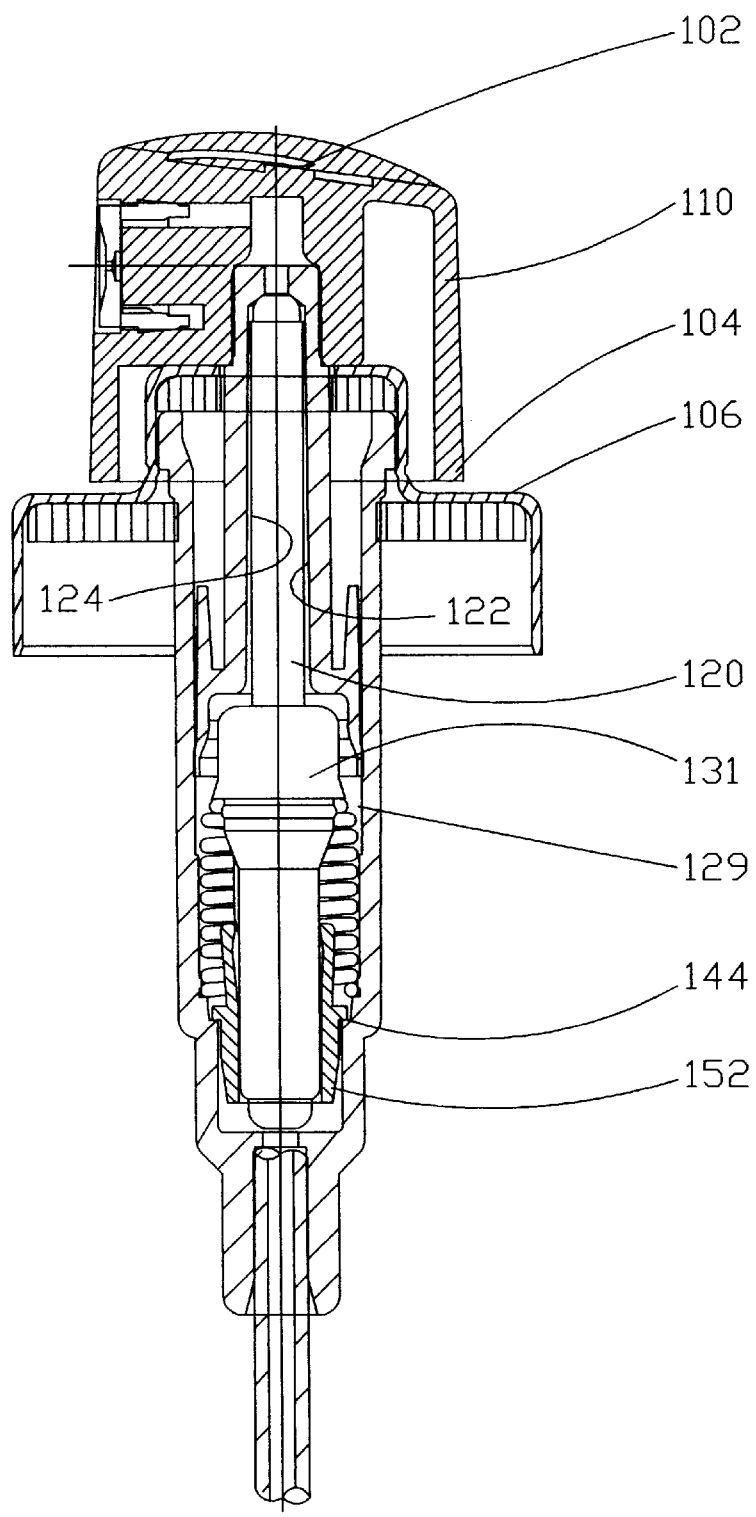
FIG. 3 is a cross-sectional view of the pump assembly of FIG. 2, with the cap fully depressed and the outlet valve in the closed position.

The pump is initially primed by depressing the actuator cap 110 until the lower edge 104 engages the upper surface 106 of the mounting cap 140, FIG. 3, and the flange 150 is seated on the shoulder 144. During actuation, the area within the pumping chamber 129 is decreased to a minimum and air contained within the chamber 129 is compress and then expelled, as hereinafter explained. Once the cap 110 is released, the liquid is drawn into the pumping chamber 129. Since the movement of the ring valve 152 is not constrained other than by its frictional engagement with the valve rod 146, the ring valve 152 will move upwardly in response to the spring action on the valve rod, and downwardly, in response to the fluid pressure generated by the piston.

Figure 4:
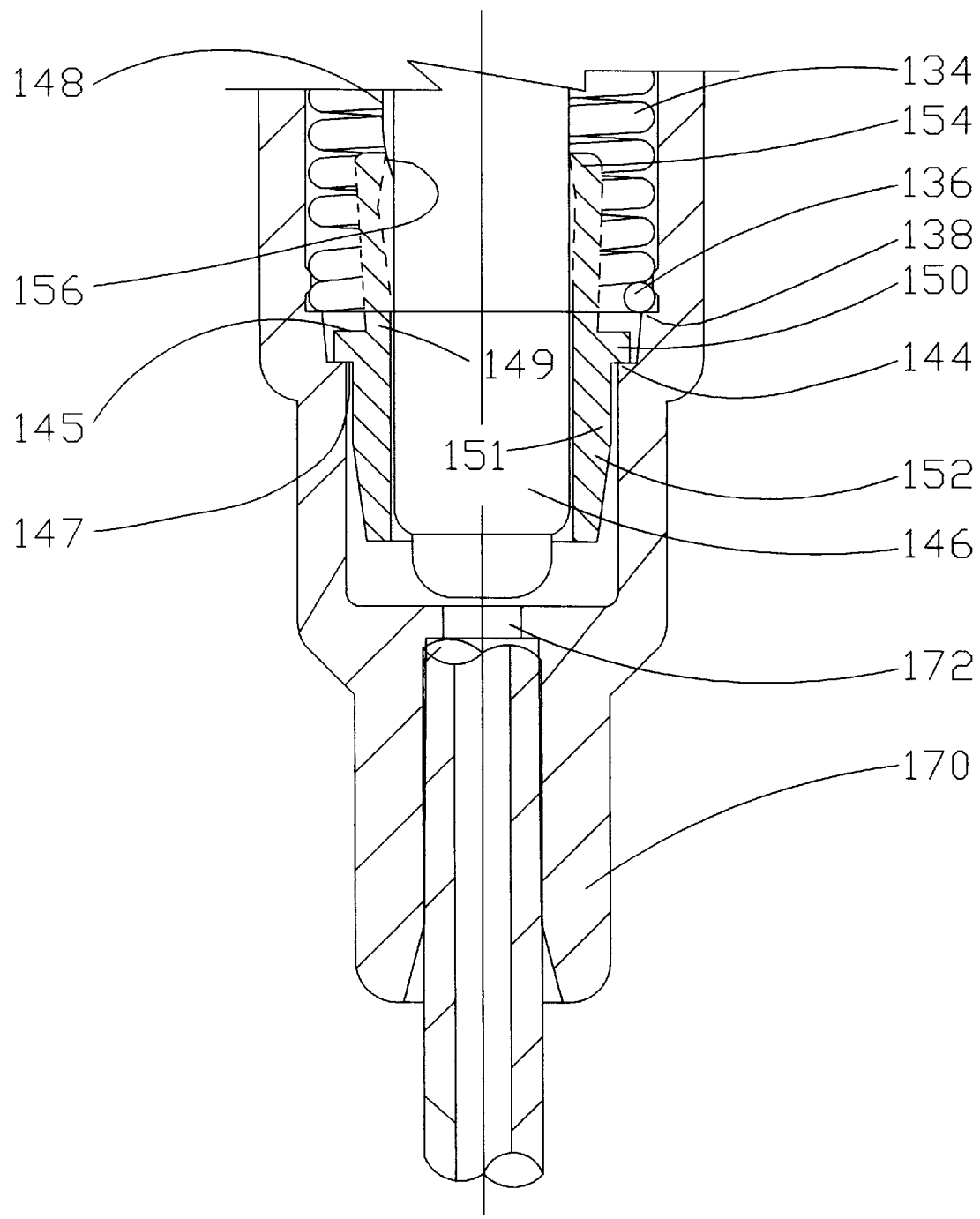
FIG. 4 is an enlarged, fragmentary illustration, in cross-section, of the lower portion of the pump assembly, showing in greater detail, the ring valve and associated elements of the pump.

In the lowermost position, as best seen in FIG. 4, the upper end 154 of the ring valve 152 is forced away from its fluid tight contact with the outer surface of the lower shaft 146 by engaging the protuberance 148. The ring valve 152 has an upper region 154 that interacts with the protuberance 148 on the surface of the rod 146 by spreading. The upper region 154 can have an inside diameter slightly less than the diameter of the valve lower rod 146. This causes the rod 146 to require a force fit into the upper region 154 of the ring valve 152. The combination of the characteristics of the ring valve material and the relative dimensions of the ring valve 152 and the valve rod 146, produces a fluid tight seal, but permits relative movement of the ring valve and the rod valve.

The protuberance 148 is positioned to engage the upper edge 156 of the ring valve 152 when the actuator cap 110, is at or near its lowermost position, as shown in FIG. 3. The engagement of the protuberance 148 with the upper edge 154 of the ring valve 152 forces the inner edge 156 of the upper edge 154 away from the valve rod 146. Consequently, during the priming step the fluid seal between the inner edge 156 of the ring valve 152 and the rod 146 is broken, and air is forced into the liquid container. After the pump is primed by one or two strokes, the protuberance 148, or corresponding groove, no longer provides a required function.

Alternatively, a plurality of protrusion can be employed, or in another alternative embodiment, a groove or plurality of grooves can be provided in the rod 146 surface, at the same location as previously described for the location of the protuberance 148.

The operation of the liquid dispensing pump, particularly with respect to the priming action, corresponds generally to that described in U.S. Pat. Nos. 3,331,559 and 4,606,479, the disclosures of which is incorporated herein by reference, as though recited in full. Once the pump has been primed, pressure on the actuator cap 110 causes the downward movement of the piston 126 and valve element 131. As the valve 131 cannot move upward, a downward force is generated against the force of the spring 134, thereby compressing the spring and decreasing the volume within the pumping chamber 129.

During actuation, the hemispherical surface 114 is moved away from the inner shoulder 118 of the upper end region of the inner chamber of the piston 126. Liquid is expelled through the nozzle 112 in a fine spray, and in a predetermined quantity. The compressive forces within the pump chamber 129 apply a downward force at the upper surface of the radially extended flange section 150, causing the flange 150 engage the upper surface of the shoulder 144, providing a fluid tight seal.

The surface area of the upper surface 145, of the flange 150, is greater than the surface area of the lower surface 147 of the flange 150. The surface area differential serves to augment the upward and downward pressure differential. The downward fluid pressure on the ring valve is thus optimized, assuring that the seating force on the ring valve is greater than the upward fluid pressure on the lower surface 147. The fluid pressure differential contributes to the producing of the fluid tight seal between the flange 150 and the shoulder 144. The surface area differential is a result of the outer diameter of the upper end 149 of the ring valve 152, being less than the outer diameter of the lower end 151 of the ring valve 152. The upper end of the ring valve is that region which extends upwardly from the flange 150, and the lower end, is that region of the ring valve 152 which extends downwardly from the flange 150.

It should be noted that the two critical regions of the ring valve 152 are the flange section 150 and the upper edge 154. The upper edge 154 provides the sliding seal and the flange section 150 provides a seal when in the seated position against the reciprocal flat surface provided by the cylinder shoulder. The protuberance 148, or a corresponding groove, would be positioned on the lower shaft element 146, so as to interact with the ring valve at the close of the compression cycle. Alternatively, the ring valve can be in the form of a short ring, comparable in configuration to a washer, with the interior surface providing the sliding seal and the outer ring portion providing an inlet seal, when seated. It is noted that the structure of the valve 152 provides advantages over the valve designs of the U.S. Pat. No. 3,331,559 and the U.S. Pat. No. 4,606,479.

In the U.S. Pat. No. 3,331,559 the washer type valve makes contact with the valve rod 12 and the seat 131 at the same relative positions. Thus, the rod 12 must extend below the washer 17 and the seat 131 by an amount greater than the length of travel of the rod 12. In contrast, in the present invention the inner contact surface 156 is substantially higher than the flange 150, the rod need not extend as far below the flange 150, as the rod 12 of U.S. Pat. No. 3,331,559 must extend below the shoulder 131. This in turn makes for a shorter cylinder in the present invention, more desirable for packaging purposes.

In the U.S. Pat. No. 4,606,479, the engagement of the inlet valve and the cylinder occurs in sliding engagement of the annular ring protruding from the cylinder floor and the inside wall of the bottom part of the valve. This arrangement necessitates a more complex cylinder construction, higher tolerances in manufacturing and material quality, as compared with the present invention, where the seal is obtained by the simple engagement of two reciprocal flat surfaces.

Figure 2:
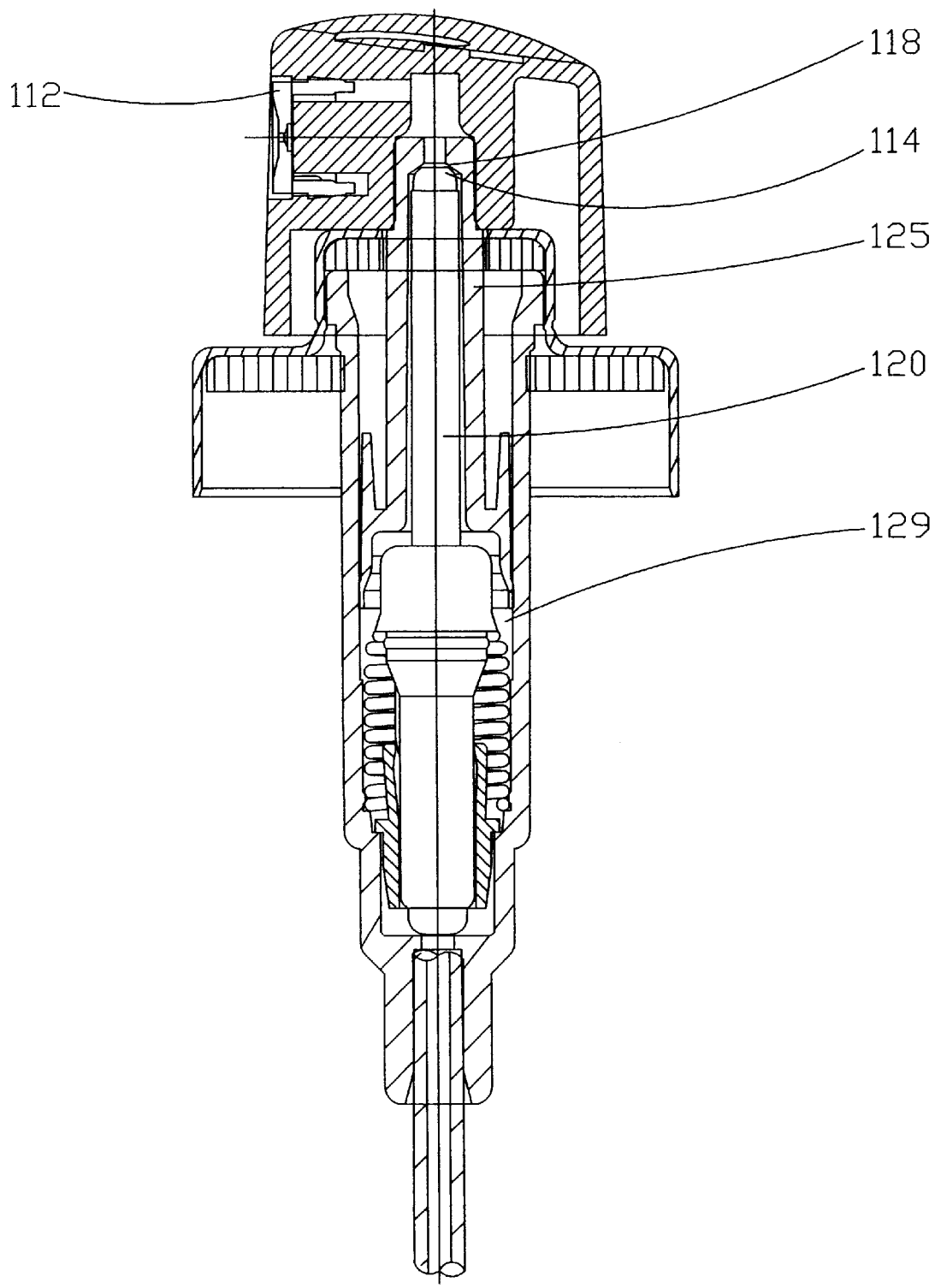
FIG. 2 is a cross-sectional view of the pump assembly with the pump cap depressed and the outlet valve in the open position.

As illustrated in FIG. 2, the hemispherical surface 114 of the upper rod 120, is drawn away from its fluid tight engagement with the inner shoulder 118 of the piston 125, and fluid can pass from the pumping chamber 129 and out through the spray nozzle 112.

During the upward movement of the actuator cap 110, the pressure within the pump chamber 129 is decreased to the point where the force of the spring 134 is greater than the fluid pressure within the pumping chamber 129. At that point in time, the valve rod 120 moves to its seated position within the piston 126, and a fluid tight seal is reestablished between the upper end 114 of the valve rod 120 and the inner shoulder 118 of the piston 126.

Figure 5:
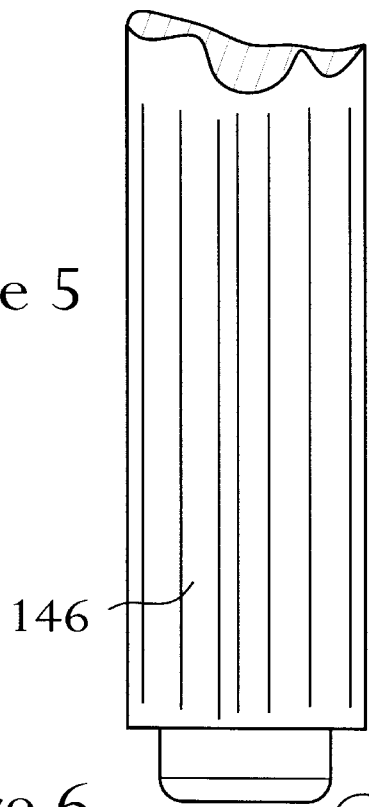
FIG. 5 is a fragmentary side view of the lower rod portion of the reciprocal valve.
Figure 7:
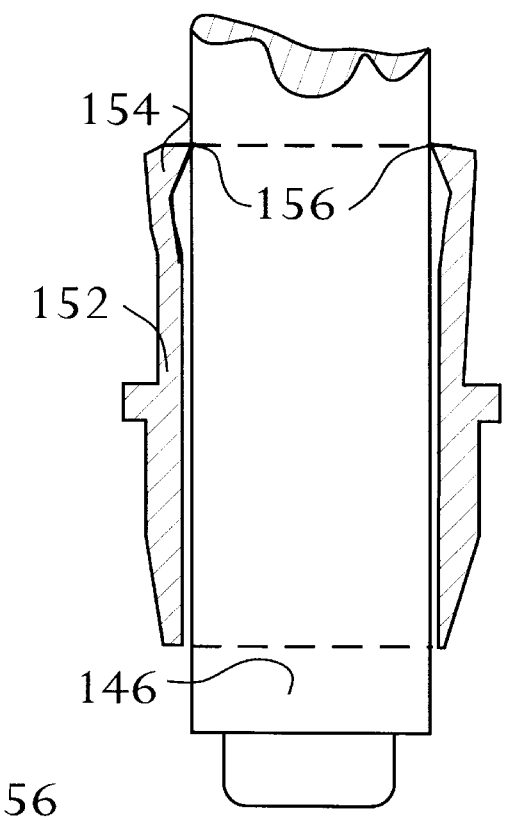
FIG. 7 is a fragmentary cross-sectional view of the ring valve mounted on the rod portion of the reciprocal valve.
Figure 6:
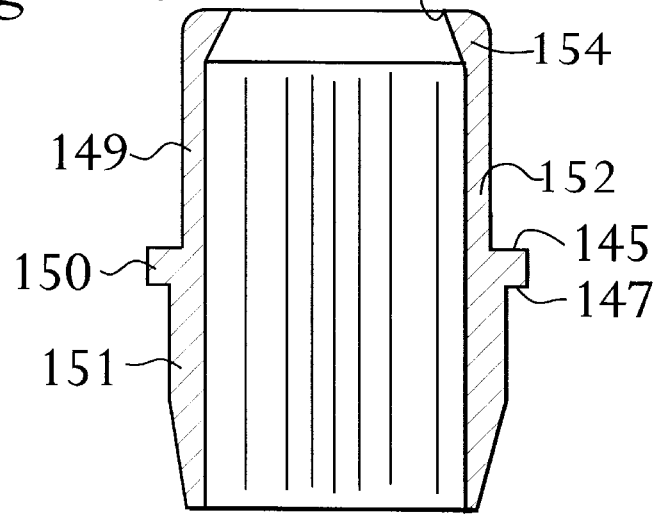
FIG. 6 is a cross-sectional view of the ring valve, shown proportional in size to FIG. 5.

FIGS. 5 and 6 illustrate the relative size of the rod 146 and ring valve 154. It is seen that the diameter of the uppermost, inner edge 156 of the upper edge 154 of the ring valve 152, has a slightly smaller diameter than the diameter of the rod 146. Thus, as seen in FIG. 7, the upper edge 154 of the ring valve 152 is distended to accommodate the rod 146, providing a liquid tight seal without precluding the sliding of the ring valve 152 along the shaft of the rod 146.

The preferred materials of construction are polypropylene for the cylinder, low density polyethylene for the inlet valve, and high density polyethylene for the rod and the piston. Polypropylene, and high and low density polyethylene represent low cost plastics.

| Glossary of Terms | |
|---|---|
| Depression | 102 |
| lower edge | 104 |
| upper surface | 106 |
| actuator cap member | 110 |
| nozzle | 112 |
| hemispherical upper end | 114 |
| reduced diameter opening | 115 |
| upper outlet end | 116 |
| inner shoulder | 118 |
| upper rod valve | 120 |
| rod valve | 121 |
| piston inner surface | 122 |
| outer surface of 120 | 124 |

| -continued | |
|---|---|
| Glossary of Terms | |
| upper hollow stem of piston | 125 |
| piston | 126 |
| outer surface of 125 | 127 |
| cylinder | 128 |
| pumping chamber | 129 |
| flared spring retainer member | 130 |
| radially enlarged element | 131 |
| upper coil region | 132 |
| spring | 134 |
| lowermost coil | 136 |
| shoulder | 138 |
| container mounting cap | 140 |
| second liquid sealing gasket | 142 |
| shoulder | 144 |
| upper surface of flange 150 | 145 |
| lower shaft element / rod | 146 |
| lower surface of flange 150 | 147 |
| protuberance | 148 |
| upper region of ring valve | 149 |
| radially extended flange section | 150 |
| lower region of ring valve | 151 |
| ring valve | 152 |
| upper edge of 152 | 154 |
| inner edge of 154 | 156 |
| upper shoulder of cylinder 128 | 160 |
| hollow dip tube | 170 |
| inlet | 172 |
| upper gasket | 194 |

What is claimed is:

1. A venting, pre-compression pump sprayer, comprising a pump housing having a pump cylinder, a pump piston mounted for reciprocation within said cylinder and defining a variable volume pump chamber, said piston having a hollow stem defining a discharge passage, a discharge valve seat at the outlet end of a discharge valve member mounted for reciprocation within said piston, said discharge valve member having
a valve surface in sealing engagement with said valve seat in a discharge closed position, and
an elongated region extending downwardly to a valve inlet, a return spring, said piston and said valve member being capable of reciprocating substantially in unison against the bias of a return spring, a ring seal member, said ring seal member being an elongated member having a cylindrical body section and a neck section at its upper end, said neck section being in sliding and frictional engagement with said elongated region, and being in liquid tight, sliding engagement with said elongated region, and said ring seal member having a radially enlarged region positioned to engage a shoulder region of said pump housing, and providing an inlet valve seal when said region is seated on said shoulder, said ring seal radially enlarged region having an upper radially extending surface and a lower radially extending surface, said upper surface having a first surface area and said lower surface having a second surface area, said first surface area being substantially greater than said second surface, thereby augmenting the seating force on said ring seal member when said ring seal is in a sealing position.

2. The pump sprayer of claim 1, wherein the surface area of said ring seal first surface is greater than the area of said second surface that is exposed to fluid pressure when said ring seal is in a sealing position.

3. The pump sprayer according to claim 1, wherein said cylindrical body section has a clearance fit with said discharge valve member elongated region.

4. The pump sprayer according to claim 1, wherein said valve member has an inlet valve seal in engagement with a wall of a reduced diameter shoulder on said housing for controlling an inlet passage to said pump chamber, said elongated region having means cooperating with said inlet valve seal at the end portion of the down stroke movement of said piston for expelling the entrapped air from said chamber outwardly of said pump chamber through said inlet passage, into a liquid container.

5. The pump sprayer according to claim 4, wherein said cooperating means comprises at least one longitudinal seal breaking member on a distal region of said elongated region, relative to said valve inlet.

6. The pump sprayer according to claim 1, wherein said piston has a piston seal in sliding sealing engagement with said cylinder, said discharge valve seat being located at an end discharge passage adjacent said piston seal.

7. The pump sprayer according to claim 1, wherein said discharge valve member has a conical nose portion engageable with said discharge valve seat.

8. The pump sprayer according to claim 1, wherein said ring seal member is an elongated member having a cylindrical body section and a neck section at its upper end, said neck section said ring seal member radially enlarged region positioned to engage said shoulder region of said pump housing, is longitudinally offset from said neck section, said neck section being positioned closer to the discharge end of said pump, than said radially enlarged region.

9. The pump sprayer according to claim 8, wherein said ring seal member has an outer diameter above said radially enlarged region which is substantially greater than the outer diameter of said ring seal member below said radially enlarged region.

10. The pump sprayer according to claim 1, wherein said ring seal member has an outer diameter above said radially enlarged region which is substantially greater than the outer diameter of said ring seal member below said radially enlarged region.

11. A venting, pre-compression pump sprayer, comprising;
a pump housing having a pump cylinder,
a pump piston mounted for reciprocation within said pump cylinder and defining a variable volume pump chamber,
said pump piston having a hollow stem defining a discharge passage,
a discharge valve seat at the outlet end of a discharge valve member,
said discharge valve member being mounted for reciprocation within said piston, and having
a valve surface in sealing engagement with said valve seat in a discharge closed position, and
an elongated region extending downwardly to a valve inlet,
said piston and said valve member being capable of reciprocating substantially in unison with said pump piston against the bias of a return spring, and
a ring seal member,
said ring seal member being in liquid tight, sliding engagement with said pump elongated region and being movable between an inlet closed position and an inlet open position, said elongated region having means positioned to cooperate with said inlet valve seal, at the end portion of the down stroke, to unseal said ring seal member's liquid tight engagement with said pump elongated region, for expelling entrapped air from said chamber outwardly of said pump chamber through said inlet passage, into a liquid container.

12. The pump sprayer according to claim 11, wherein said cooperating means comprises at least one longitudinally extending seal breaking member on said elongated region.

13. The pump sprayer according to claim 12, wherein said ring seal member is an elongated member having a cylindrical body section and a neck section at its upper end, said neck section of said ring seal member radially enlarged region positioned to engage said shoulder region of said pump housing, is longitudinally offset from said neck section, said neck section being positioned closer to the discharge end of said pump, than said radially enlarged region.

14. The pump sprayer according to claim 11, wherein said at least one longitudinal seal breaking member is a protuberance.

15. The pump sprayer according to claim 11, wherein said at least one longitudinal seal breaking member is a groove.

16. The pump sprayer according to claim 11, said ring seal member having a radially enlarged region,
said radially enlarged region being seated, in fluid tight engagement with a reduced diameter shoulder on said housing, when said ring seal member is in said inlet closed position, thereby providing an inlet seal and closing an inlet passage to said pump chamber.

17. The pump sprayer according to claim 16, wherein said ring seal radially enlarged region has an upper radially extending surface and a lower radially extending surface, said upper surface having a first surface area and said lower surface having a second surface area, said first surface area being substantially greater than said second surface, thereby augmenting the seating force on said ring seal member when said ring seal is in a sealing position.

18. The pump sprayer according to claim 11, said ring seal member having a radially enlarged region positioned to engage a shoulder region of said pump housing, and providing an inlet valve seal when said region is seated on said shoulder.

19. The pump sprayer according to claim 18, wherein said ring seal radially enlarged region has an upper radially extending surface and a lower radially extending surface, said upper surface having a first surface area and said lower surface having a second surface area, said first surface area being substantially greater than said second surface, thereby augmenting the seating force on said ring seal member when said ring seal is in a sealing position.

20. The pump sprayer according to claim 11, wherein said ring seal member is an elongated member having a cylindrical body section and a neck section at its upper end, said neck section of said ring seal member radially enlarged region positioned to engage said shoulder region of said pump housing, is longitudinally offset from said neck section, said neck section being positioned closer to the discharge end of said pump, than said radially enlarged region.

* * * * *